Feb. 23, 1965  J. A. NORTON ETAL  3,170,826
METHOD OF BONDING A FILTER PAPER TUBE
TO SUPPORTING END PLATES
Filed May 4, 1961

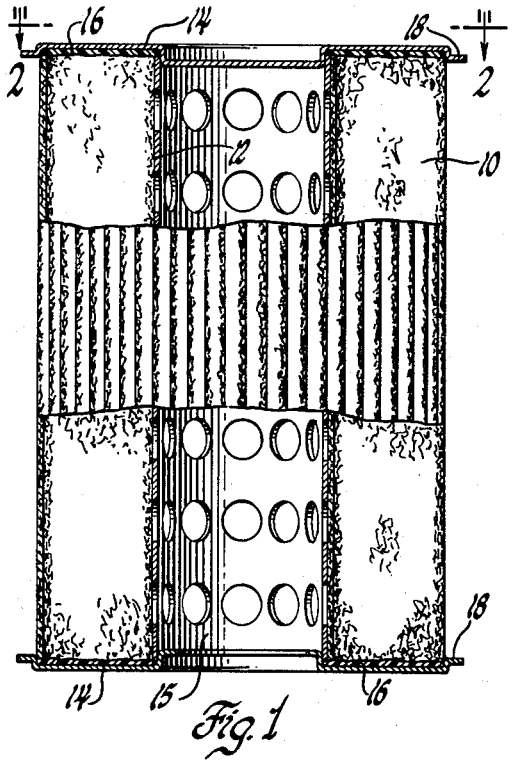

Fig. 1

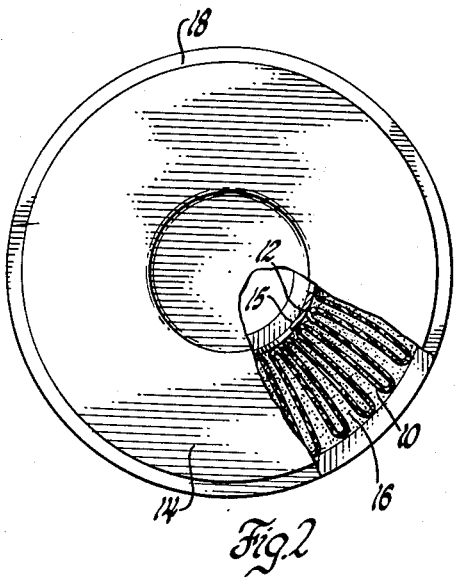

Fig. 2

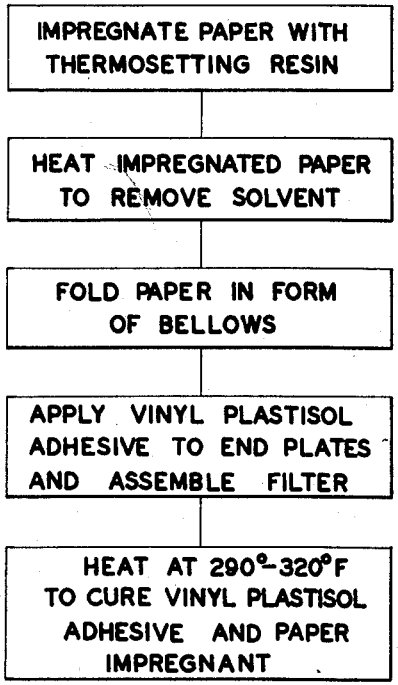

IMPREGNATE PAPER WITH
THERMOSETTING RESIN

HEAT IMPREGNATED PAPER
TO REMOVE SOLVENT

FOLD PAPER IN FORM
OF BELLOWS

APPLY VINYL PLASTISOL
ADHESIVE TO END PLATES
AND ASSEMBLE FILTER

HEAT AT 290°-320°F
TO CURE VINYL PLASTISOL
ADHESIVE AND PAPER
IMPREGNANT

Fig. 3

INVENTORS
James A. Norton &
BY David P. Lake

Peter P. Kozak
ATTORNEY

United States Patent Office 3,170,826
Patented Feb. 23, 1965

3,170,826
METHOD OF BONDING A FILTER PAPER TUBE TO SUPPORTING END PLATES
James A. Norton and David P. Lake, Flint, Mich., assignors to General Motors Corporation, Detroit, Mich., a corporation of Delaware
Filed May 4, 1961, Ser. No. 107,705
6 Claims. (Cl. 156—69)

This invention relates to paper-type filter elements and more particularly to improvements in the manufacturing methods of such paper filter elements.

Paper-type filter elements which have become conventional for use in filtering lubricating oils, gasoline and the like particularly in connection with the operation of internal combustion engines consist generally of a paper cylinder, the walls of which are preferably folded to a bellows-like configuration to provide for increased filtering surface area and structural strength, to which is fastened on each end thereof an end plate of relatively rigid material such as metal or a fiber reinforced plastic material. Perforated metal sheels disposed along the length of the paper cylinder provide the element wtih structural strength. The filter elements are inserted into a housing whereby the fluid to be filtered passes into the filter radially of the paper element and passes out through the axial opening thereof. The end caps and side shells provide means for supporting the filter element within the filter housing.

Typical practice in the manufacture of the filter paper involves first impregnating it with a suitable heat-curable phenol-formaldehyde resin which is capable upon curing of providing the paper with resistance against tearing and collapse without impairing the porosity and filtering capability thereof. Desirably the paper is adhesively bonded to the end plates by means of an adhesive which upon curing will exhibit a sufficient degree of flexibility so that the typical car vibrations will not fracture the bond between the filter paper and the end plates, which will cure substantially below the charring temperatures of the filter paper and which will not be attacked by the petroleum hydrocarbon fluids in connection with which it is used.

It is the basic object of this invention to provide a more efficient and economical method for making paper-type filter elements which involves the use of a resinous composition for impregnating the filter paper and a vinyl plastisol adhesive for bonding the filter paper to supporting end plates which will cure at reduced temperatures in the vicinity of about 300° F. to 320° F., a temperature range safely below the charring temperature of the paper and a temperature at which both the impregnant and the adhesive will efficiently and economically cure in a single heating operation.

This and other objects of the invention are accomplished by providing a process for making filter elements in which the adhesive for bonding the filter paper to the supporting end plates comprises major proportions of a vinyl plastisol and minor proportions of a compound selected from the group consisting of a phenol having 2 to 4 hydroxyl groups attached to the benzene ring, and an aminophenol, and a material such as hexamethylenetetramine which is nonreactive with respect to the polyhydric phenol or aminophenol at room temperatures but which at elevated temperatures will decompose to generate an aldehyde.

Other objects and advantages of the invention will be apparent from the following detailed description of the invention made in conjunction with the accompanying drawing, in which:

FIGURE 1 is an elevation view in partial cross section of a filter element;

FIGURE 2 is an end view of the element in partial cross section; and

FIGURE 3 is a flow diagram of the method of this invention.

As shown in FIGURE 1, a paper-type filter element involved in this invention includes a folded paper element 10 formed into a cylinder having a central axial opening 12 therethrough. To each end of the paper cylinder there is bonded a rigid plate 14 by means for an adhesive layer 16. Preferably the plates 14 include flanged or offset end portions 18 and an inner flanged or offset portion 20 which serves to form a depression for retaining the ends of the filter element 10, and an inner perforated shell 15 which provides the assembly with suitable structural strength. As will be hereinafter described, the adhesive layer 16 is deposited in the depression between the offset portions 18 and 20 of the end plate in liquid form. The end of the paper element is immersed in the adhesive layer so that the adhesive will soak into the paper element to insure that a sealing bond is formed between the paper and the end plate.

As is well known in the art, the filter element as shown in FIGURE 1 is clamped in a housing so that a seal is provided between the end plates 14 and the housing. The housing is arranged so that the fluid to be filtered enters the central space 12 of the filter in a direction radially of the paper cylinder and passes out through the axial opening 12.

In general, the manufacture of the filter element involves the sequential steps of first impregnating the paper with a suitable thermosetting resin suspended in a low viscosity solvent, then subjecting the impregnated paper to heat to drive off the solvent without significantly curing the resin, folding the paper and forming it into a cylinder as shown in FIGURE 1, applying the adhesive material to the depressions formed between the offset portions 18 and 20 in the form of a layer 16, then assembling the end plates and paper element so that the ends of the paper element are immersed in the adhesive layer 18 and finally the assembly is placed in an oven for a predetermined time whereby the resin impregnant will cure to a predetermined degree without charring and the adhesive will cure to firmly bond the paper cylinder 10 to the end plates.

The first step in the manufacture of the filter element involves the impregnation of the paper in order to impart to it suitable structural resistance toward collapse and tearing in operational use. Preferably the paper is impregnated with a resol phenolic varnish by means of a calendering apparatus such as is disclosed in the United States Patent No. 2,700,620 Somers, assigned to the assignee of the present invention. This resin varnish consists essentially of the resole form of phenol-formaldehyde resin contained in a solvent such as ethanol. A preferred impregnant for this purpose is disclosed in the copending patent application Serial No. 107,704, filed May 4, 1961, filed simultaneously herewith and assigned to the assignee of the present invention. The impregnated paper is passed into a drying oven where most of the solvent is permitted to evaporate without significant cure of the resin material to permit subsequent folding and handling of the paper. This oven is preferably maintained at a temperature of between 140° F. and 190° F. depending upon the character of the impregnant used. The resole-type resin which is deposited in the filter paper will readily cure at temperatures ranging from about 290° F. to 360° F. However, since the paper tends to char in the vicinity of about 345° F., it is essential that the curing of the paper impregnant be accomplished quickly and preferably at temperatures substantially below 345° F.

An important aspect of this invention involves the provision of a vinyl plastisol adhesive to form the adhesion layer 16. The bond produced by means of the adhesive composition of this invention is at least equal to the strength of the paper, it is relatively flexible on being cured and is substantially inert with respect to petroleum hydrocarbons and may be efficiently cured at reduced temperatures in the vicinity of about 290° F. to 320° F. during the same time that the resole base paper impregnant is cured to between 83% and 92% of completion, the desired degree of cure of the impregnant. This curing temperature provides a highly advantageous margin of safety with respect to the danger of charring of the paper. The bonds produced at these lower temperatures are equivalent to or superior to the bonds produced by other vinyl plastisol-type adhesives at higher temperatures.

In general, the term "plastisol" as used herein is intended to refer to a liquid material comprising a finely divided solid vinyl resin such as polyvinyl chloride suspended in an organic liquid which has an insignificant solvent effect on the resin at room temperature but which at elevated temperatures solvates the solid resin to gel and fuse to form a material resembling a cured rubber. In the preparation of a typical plastisol a vinyl resin such as polyvinyl chloride or a copolymer of vinyl chloride and other vinyl resins such as vinyl acetate and vinylidene chloride is thoroughly dispersed in the organic liquid which is generally termed a plasticizer. Typically, the resin is a relatively high molecular weight ester or a mixture of esters such as tricresyl phosphate, dioctyl phthalate, dibutyl sebacate and the like. Other plasticizers commonly used include polymeric polyesters and epoxidized vegetable oils. To this dispersion there may be added stabilizers such as dibasic lead phosphate, dyes, pigments and fillers such as calcium carbonate as is well known in the art. These plastisols, however, do not ordinarily exhibit any significant adhesive properties which would make them useful for typical adhesive uses.

In order that the plastisol is provided with suitable adhesive properties which will cure rapidly and preferably at reduced temperatures in the vicinity of 290° F. to 320° F., small quantities of a di- or polyhydric phenol having 3 or 4 hydroxyl groups attached to the benzene ring or an aminophenol is added to the plastisol together with a substance which is substantially non-reactive toward these aromatic hydroxy compounds at room temperatures but which at elevated temperatures will generate an aldehyde to produce reactive conditions leading to the formation of a phenol-aldehyde-type condensation product which imparts to the vinyl plastisol excellent adhesion properties.

A preferred embodiment of the vinyl plastisol adhesive of this invention consists of a plastisol-grade polyvinyl chloride thoroughly dispersed in a dioctyl phthalate plasticizer in proportions of about 100 parts of the plasticizer by weight to 100 parts of the resin. The proportion of the plasticizer to resin may range from about 55 parts of the plasticizer per 100 parts of the resin to about 125 parts of the plasticizer to 100 parts of the resin depending on the viscosity of the plasticizer and the particular character of the resin used as is well known in the art. The resin portion may include copolymers of polyvinyl chloride and similar polymers such as polyvinyl acetate. In order that the plastisol is provided with suitable adhesive properties which will cure in the temperature range of about 290° F. to 320° F., about 1% by weight of resorcinol together with about 2% by weight of hexamethylenetetramine are added to the vinyl plastisol in a substantially unreacted condition. These ingredients which are solids at room temperature may be ground to a fine powder and mixed with the vinyl resin powder before mixing with the plasticizer, or they may be wetted with a little plasticizer and mixed with the plastisol. Satisfactory adhesion and cure in the aforementioned temperature range is obtained with a variance of the resorcinol of between about 0.3% and 3% by weight and a variance in the hexamethylenetetramine of about 0.1% to 6% by weight. The upper limits of 3% and 6% respectively for the resorcinol and hexamethylenetetramine are practical limits. Additional amounts of each compound may be used. However, such additional amounts serve no useful purpose since at the 290° F. to 320° F. curing temperature level no significantly improved tensile strength or faster curing time is obtained by such additional increases. In fact, it has been found that the time necessary to cure a plastisol having resorcinol and hexamethylenetetramine above the limits of 3% and 6% is greater than that required below these limits. Amounts of resorcinol and hexamethylenetetramine up to 10% and 15% respectively may be used. However, beyond this point the adhesive on curing loses the desired degree of flexibility. These ingredients are, of course, thoroughly mixed to form a homogeneous mixture. Various ingredients commonly included in plastisols such as stabilizers in the form of barium-cadmium compounds and dibasic lead phosphate, fillers such as calcium carbonate and dyes and pigments may be added to the plastisol.

It has been found that various dihydroxy, trihydroxy and tetrahydroxy phenols and m-aminophenol may be substituted in place of the resorcinol in similar proportions with similar results. Other dihydroxy phenols found satisfactory include catechol and hydroquinone. Trihydroxy phenols found suitable include phloroglucinol, pyrogallol and hydroxyhydroquinone. Tetrahydroxy benzene and 2,2',4,4' tetrahydroxybenzophenone have also been found suitable.

Other aldehyde-generating substances which may be used in place of the hexamethylenetetramine in similar proportions include paraformaldehyde, aldehyde ammonia, trioxane plus a catalyst such as aluminum chloride, zinc chloride and boron trifluoride monoethylamine. The aldehyde ammonia on being heated produces acetaldehyde and reacts with the di- or polyhydric phenol or aminophenol with satisfactory results.

Other plasticizers which may be used in the plastisol composition include diisooctyl phthalate, didecyl phthalate, diisodecyl phthalate, octyldecyl phthalate, butyloctyl phthalate, butyldecyl phthalate and dicapryl phthalate, polmeric polyester plasticizers and epoxidized vegetable oils.

In the final step of the process the adhesive composition which is in the form of a relatively viscous liquid is applied to the inner surfaces of the end plates 14 in the form of the layer 16 having a thickness of about ⅛ inch to about 3⁄16 inch. The ends of the paper elements 10 are then immersed in the plastisol layers, care being taken so that the plates 14 are parallel to each other and each end of the paper element is enveloped in the vinyl plastisol adhesive. The assembly is then placed in an oven maintained between about 290° F. and 320° F. for a time sufficient to cure the paper impregnant to about 83% to 92% of its completely cured state and to cause a fusion of the plastisol and a cure of the polyhydroxy benzene-aldehyde-generating compound components. During the heating process the formaldehyde-generating components generate formaldehyde or the equivalent thereof to produce reactive conditions favorable to the production of adhesive thermosetting condensation products. The bond between the end plates 14 and the paper element 10 is stronger than the paper conventionally used in filter applications. As is understood in the art, the filter paper impregnant is cured to about 83% to 92% of completion since above this percentage of cure the paper tends to become excessively brittle while below this range, the uncured portions of the impregnant tend to be dissolved out by the hydrocarbon being filtered.

The time during which the paper element is kept within the oven in the temperature range of 290° F. to 320° F. will vary considerably with the particular characteristics of each oven. However, in accordance with this invention, the time of cure is similar to that necessary to achieve a cure of about 83% to 92% of the impregnant as well as a fusion of the plastisol and the formation and cure of the polyhydroxy or aminophenol-aldehyde components. Under specific operation conditions, for example, satisfactory cure of all of the compositions was achieved in 15 minutes at 310° F. Cures below 290° F. are avoided since the plastisol does not fuse efficiently at these temperatures.

An important advantage of this invention is that polyhydroxy or aminophenol-aldehyde-generating components mixed with the plastisol do not reduce its shelf-life. The material develops adhesive properties only after being heated to an elevated tempertaure so as to cause the aldehyde-generating substance to decompose and produce the free aldehyde and an environment favorable to the reaction of the aldehyde and the polyhydric or aminophenol.

The aldehyde-generating substance is selected to generate an aldehyde at elevated temperatures so that no significant reaction takes place between the phenolic compound and the aldehyde-generating compound at room or shop temperatures. In this context, the term "elevated temperature" is intended to refer to a temperature substantially above room or shop temperatures, for example, temperatures in excess of about 150° F.

Although the invention has been described in terms of certain embodiments, it is to be understood that variations may be employed and the invention is not limited thereby except as defined in the following claims.

We claim:

1. In a process for making filter elements the steps comprising forming a paper tube having ends and bonding rigid end plates to said ends by means of an adhesive composition comprising a vinyl plastisol including small amounts of a phenol having from 2 to 4 hydroxyl groups and a compound capable of generating an aldehyde at elevated temperatures reactive with said phenol, said amounts being sufficient to impart adhesive properties to said plastisol.

2. A process for making filter elements comprising the steps of forming a paper tube having ends, placing an end plate adjacent one of said ends, applying a layer of adhesive between said one end and said end plate, said adhesive comprising a vinyl plastisol including a phenol having from 2 to 4 hydroxyl groups and a compound capable of generating an aldehyde in excess of about 290° F. reactive with said phenol, and heating the assembly at a temperature of about 290° F. to 320° F. for a time sufficient to effect a fusion of said vinyl plastisol and a reaction and cure of said phenol and said aldehyde, to effect a bond between said one end and said end plate.

3. A process for making a filter element comprising the steps of impregnating filter paper with a phenolic resin capable of curing in a temperature range of about 290° F. to 320° F., forming said paper into a tubular configuration having ends, placing an end plate adjacent one of said ends, applying an adhesive layer between said end plate and said one end, and subjecting the assembly to heat at a temperature of from about 290° F. to 320° F. for a time sufficient to cure said adhesive and said resin to a degree of about 83% to 92%, said adhesive comprising a vinyl plastisol including at least 0.3% by weight of a phenol having 2 to 4 hydroxyl groups and a compound capable of generating an aldehyde at elevated temperatures.

4. A process for making a filter element comprising the steps of impregnating filter paper with a phenolic resin capable of curing in a temperature range of about 290° F. to 320° F., forming said paper into a tubular configuration having ends, placing an end plate adjacent one of said ends, applying an adhesive layer between said end plate and said one end, subjecting the assembly to heat at a temperature from about 290° F. to 320° F. for a time sufficient to cure said adhesive and said resin to a degree of about 83% to 92% of completion, said adhesive comprising a vinyl plastisol including about 0.3% to 3% by weight of a phenol having 2 to 4 hydroxyl groups and about 0.1% to 6% by weight of hexamethylenetetramine.

5. A process for making a filter element comprising the steps of impregnating filter paper with a phenolic resin capable of curing in a temperature range of about 290° F. to 320° F., forming said paper into a tubular configuration having ends, placing an end plate adjacent one end of said paper element, applying an adhesive layer between said end plate and said one end, subjecting the assembly to heat at a temperature from about 290° F. to 320° F. for a time sufficient to cure said adhesive and said resin to a degree of about 83% to 92% of completion, said adhesive comprising a vinyl plastisol including at least 0.3% by weight of resorcinol and at least 0.1% by weight of a compound capable of generating an aldehyde at elevated temperatures.

6. A process for making a filter element comprising the steps of impregnating filter paper with a phenolic resin capable of curing in a temperature range of about 290° F. to 320° F., forming said paper into a tubular configuration having ends, placing an end plate adjacent one end of said paper element, applying an adhesive layer between said end plate and said one end, and subjecting the assembly to heat at a temperature of from about 290° F. to 320° F. for a time sufficient to cure said adhesive and said resin to a degree of about 83% to 92%, said adhesive comprising a vinyl plastisol including at least 0.3% by weight of aminophenol and a compound capable of generating an aldehyde at elevated temperatures.

References Cited in the file of this patent

UNITED STATES PATENTS

| 2,542,048 | Nagel | Feb. 20, 1951 |
| 2,739,916 | Parker | Mar. 27, 1956 |
| 2,749,265 | Fricke et al. | June 5, 1956 |
| 2,951,769 | McKnight | Sept. 6, 1960 |

FOREIGN PATENTS

| 120,558 | Australia | Nov. 5, 1945 |